(12) United States Patent
Iwatani

(10) Patent No.: US 9,488,080 B2
(45) Date of Patent: Nov. 8, 2016

(54) EXHAUST GAS PURIFICATION APPARATUS FOR INTERNAL COMBUSTION ENGINE

(71) Applicant: Kazuki Iwatani, Susono (JP)

(72) Inventor: Kazuki Iwatani, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/655,107

(22) PCT Filed: Oct. 31, 2013

(86) PCT No.: PCT/JP2013/079574
§ 371 (c)(1),
(2) Date: Jun. 24, 2015

(87) PCT Pub. No.: WO2014/103505
PCT Pub. Date: Jul. 3, 2014

(65) Prior Publication Data
US 2015/0345359 A1 Dec. 3, 2015

(30) Foreign Application Priority Data
Dec. 25, 2012 (JP) .................. 2012-280997

(51) Int. Cl.
*F01N 3/36* (2006.01)
*F01N 3/021* (2006.01)
(Continued)

(52) U.S. Cl.
CPC ........... *F01N 3/021* (2013.01); *B01D 53/9477* (2013.01); *B01D 53/9495* (2013.01);
(Continued)

(58) Field of Classification Search
CPC ...... F01N 3/035; F01N 3/0814; F01N 3/103; F01N 3/106; F01N 3/2033; F01N 3/2066; F01N 3/36; F01N 11/002; F01N 13/009; F01N 2550/05; F01N 2560/06; F01N 2610/03; F01N 2610/11; F01N 2610/146; F01N 2900/0412; F01N 2900/0418; F01N 2900/0422; F01N 2900/1404; F01N 2900/1602; F01N 2900/1621; F01N 2900/1811
USPC ................... 60/286, 295, 299, 301
See application file for complete search history.

(56) References Cited

U.S. PATENT DOCUMENTS

| | | |
|---|---|---|
| 2003/0036841 A1 | 2/2003 | Xu et al. |
| 2004/0194451 A1 | 10/2004 | Kawatani et al. |

(Continued)

FOREIGN PATENT DOCUMENTS

| | | |
|---|---|---|
| DE | 102010012081 A1 | 11/2010 |
| JP | 11-281250 | 10/1999 |

(Continued)

*Primary Examiner* — Thomas Denion
*Assistant Examiner* — Jorge Leon, Jr.
(74) *Attorney, Agent, or Firm* — Finnegan, Henderson, Farabow, Garrett & Dunner, LLP

(57) ABSTRACT

An object of the present invention is to suppress a reduction in an $NO_X$ purification ratio when an addition is implemented to prevent a blockage from occurring in a reducing agent addition valve. A fuel addition valve, a catalyst having an oxidation capacity, and a selective reduction type $NO_X$ catalyst are provided in sequence in an exhaust passage of an internal combustion engine, and when a temperature of the selective reduction type $NO_X$ catalyst is within a predetermined temperature range while a predetermined condition for injecting fuel from the fuel addition valve is established, an amount of fuel injected from the fuel addition valve is reduced below an amount of fuel injected when the temperature of the selective reduction type $NO_X$ catalyst is outside the predetermined temperature range.

4 Claims, 5 Drawing Sheets

(51) Int. Cl.
*F01N 3/10* (2006.01)
*F01N 3/20* (2006.01)
*F01N 9/00* (2006.01)
*F01N 13/00* (2010.01)
*F01N 11/00* (2006.01)
*B01D 53/94* (2006.01)

(52) U.S. Cl.
CPC ............... *F01N3/106* (2013.01); *F01N 3/206* (2013.01); *F01N 3/2066* (2013.01); *F01N 9/00* (2013.01); *B01D 53/944* (2013.01); *B01D 53/9418* (2013.01); *F01N 3/103* (2013.01); *F01N 3/2033* (2013.01); *F01N 3/36* (2013.01); *F01N 11/002* (2013.01); *F01N 13/009* (2014.06); *F01N 2550/05* (2013.01); *F01N 2610/02* (2013.01); *F01N 2610/03* (2013.01); *F01N 2610/146* (2013.01); *F01N 2610/1493* (2013.01); *F01N 2900/0418* (2013.01); *F01N 2900/1404* (2013.01); *F01N 2900/1602* (2013.01); *F01N 2900/1812* (2013.01); *Y02T 10/24* (2013.01); *Y02T 10/47* (2013.01)

(56) References Cited

U.S. PATENT DOCUMENTS

| | | |
|---|---|---|
| 2008/0022656 A1 | 1/2008 | Kobayashi |
| 2009/0301063 A1 | 12/2009 | Tahara et al. |
| 2010/0192547 A1* | 8/2010 | Yabe .................... F01N 13/009 60/286 |
| 2010/0242459 A1 | 9/2010 | Tsujimoto et al. |
| 2010/0250090 A1 | 9/2010 | Jasinkiewicz et al. |
| 2010/0251697 A1 | 10/2010 | Nakatani et al. |

FOREIGN PATENT DOCUMENTS

| | | |
|---|---|---|
| JP | 2003-138932 | 5/2003 |
| JP | 2004-60515 | 2/2004 |
| JP | 2007-64183 | 3/2007 |
| JP | 2007-71175 | 3/2007 |
| JP | 2009-138731 | 6/2009 |
| JP | 2009-156167 | 7/2009 |
| JP | 2012-7557 | 1/2012 |

* cited by examiner

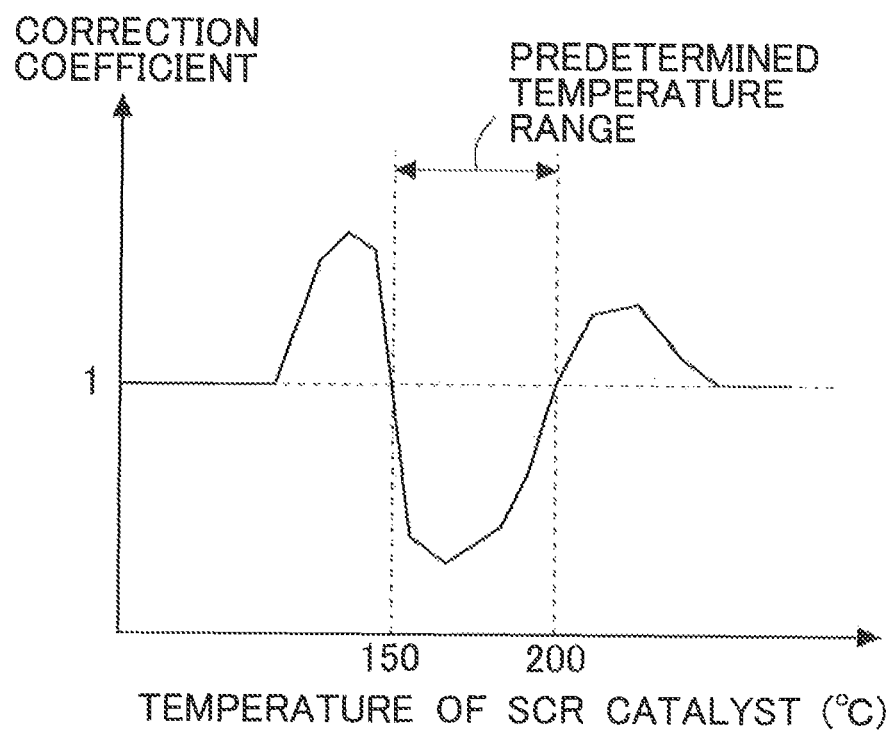

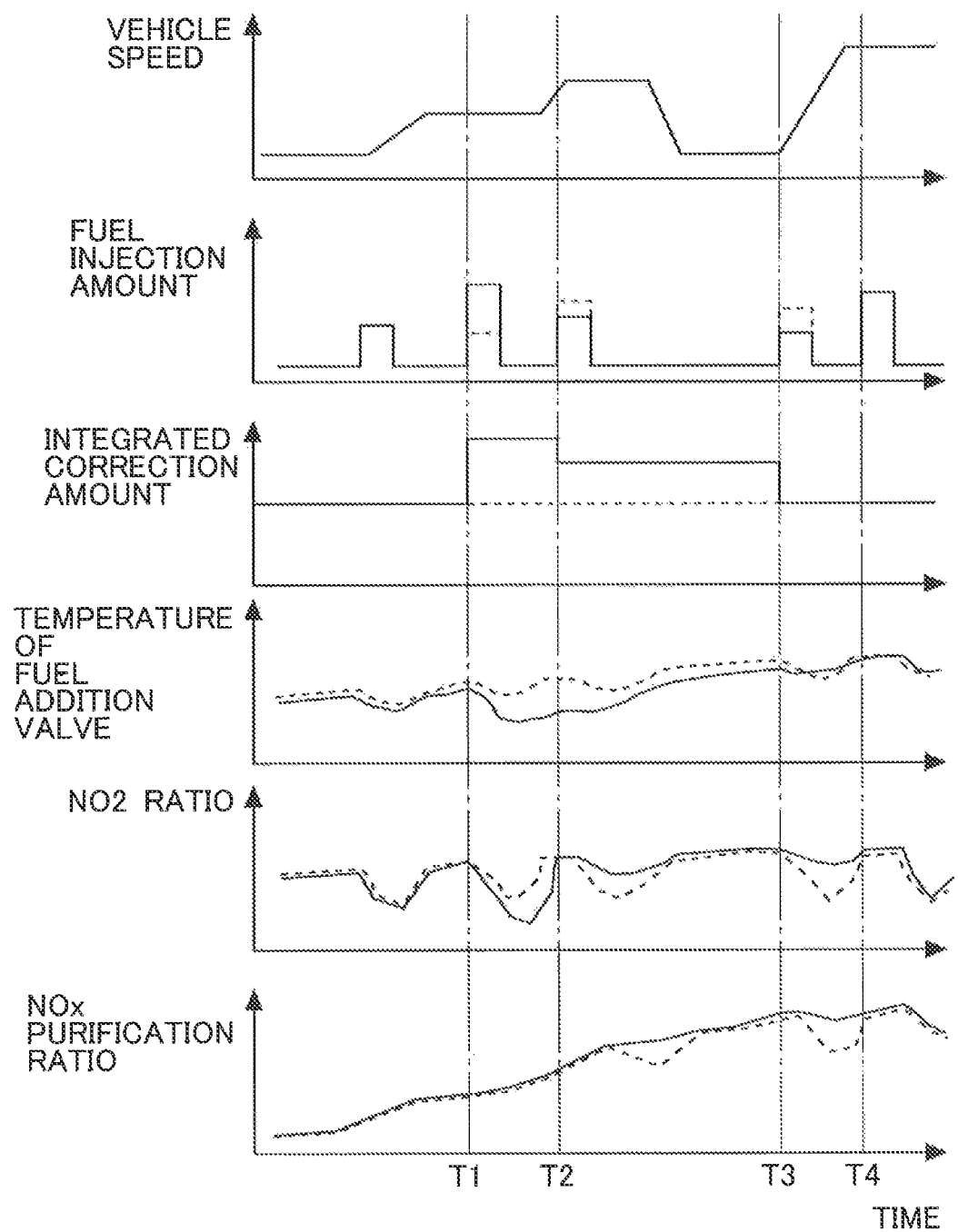

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2013/079574, filed Oct. 31, 2013, and claims the priority of Japanese Application No. 2012-280997, filed Dec. 25, 2012, the content of both of which is incorporated herein by reference.

TECHNICAL FIELD

The present invention relates to an exhaust gas purification apparatus for an internal combustion engine.

BACKGROUND ART

A reducing agent addition valve may be provided in an exhaust passage of an internal combustion engine in order to add a reducing agent. Particulate matter contained in exhaust gas adheres to the reducing agent addition valve. When a temperature of the reducing agent addition valve is high, the particulate matter adhered to the reducing agent addition valve is hardened by heat, and as a result, a nozzle hole of the reducing agent injection valve may be blocked. In other words, a blockage may occur in the reducing agent addition valve. Such a blockage can be prevented from occurring in the reducing agent addition valve by reducing the temperature of the reducing agent addition valve, and the temperature of the reducing agent addition valve can be reduced by periodically injecting the reducing agent from the reducing agent addition valve. Reducing agent addition implemented in this manner to prevent, a reducing agent blockage will be referred to hereafter as a "blockage prevention injection".

In a conventional technique, a fuel addition valve that injects fuel and an oxidation catalyst are provided in an exhaust passage of an internal combustion engine in sequence from an upstream side, and an amount of fuel added from the fuel addition valve during a blockage prevention injection is limited prior to activation of-the oxidation catalyst (see Patent Document 1, for example).

Incidentally, a selective reduction type $NO_X$ catalyst (also referred to hereafter as an SCR catalyst) may be provided on a downstream side of the oxidation catalyst. An $NO_X$ purification ratio of the SCR catalyst may vary according to a proportion of $NO_2$ within an amount of $NO_X$ contained in the exhaust gas that flows into the SCR catalyst (referred to hereafter as an $NO_2$ ratio). Here, when a blockage prevention injection is implemented, an oxidation capacity of the oxidation catalyst decreases. Accordingly, oxidation from NO into $NO_2$ is suppressed, and as a result, the $NO_2$ ratio decreases, When the $NO_2$ ratio decreases in this manner, the $NO_X$ purification ratio of the SCR catalyst may also decrease. In other words, the $NO_X$ purification ratio may decrease as a result of the blockage prevention injection.

PRIOR ART REFERENCES

Patent Documents

Patent Document 1: Japanese Patent Application Publication No. 2007-064183
Patent Document 2: Japanese Patent Application Publication No. 2004-060515
Patent Document 3: Japanese Patent Application Publication No. 2007-071175
Patent Document 4: Japanese Patent Application Publication No. 2009-138731

SUMMARY OF THE INVENTION

Problems to be Solved by the Invention

The present invention has been designed in consideration of the problem described above, and an object thereof is to suppress a reduction in an $NO_X$ purification ratio when an addition is implemented to prevent a blockage from occurring in a reducing agent addition valve.

Means for Solving the Problems

To achieve the object described, above, the present invention provides an exhaust gas purification apparatus for an internal combustion engine, including:
a first exhaust gas purification apparatus that is provided in an exhaust passage of the internal combustion engine and has an oxidation capacity;
a second exhaust gas purification apparatus that is provided in the exhaust passage downstream of the first exhaust gas purification apparatus, and has a function for selectively reducing $NO_X$; and
a fuel addition valve provided in the exhaust, passage upstream of the first exhaust gas purification apparatus in order to inject fuel into exhaust gas;
the exhaust gas purification apparatus having a control apparatus which, when a temperature of the second exhaust gas purification apparatus is within a predetermined temperature range while a predetermined condition for injecting fuel from the fuel addition valve is established, reduces an amount of fuel injected from the fuel addition valve below an amount of fuel injected when the temperature of the second exhaust gas purification apparatus is outside the predetermined temperature range.

The first exhaust gas purification apparatus includes a catalyst having an oxidation capacity, for example. This catalyst may be carried on a filter. Alternatively, an apparatus that includes a filter may be disposed downstream of the catalyst having an oxidation capacity as the first exhaust gas purification apparatus. The second exhaust gas purification apparatus includes a selective reduction type $NO_X$ catalyst, for example. The selective reduction type $NO_X$ catalyst may be carried on the filter.

The fuel addition valve supplies fuel to the first exhaust gas purification apparatus. When this fuel reacts in the first exhaust gas purification apparatus, the oxidation capacity of the first, exhaust gas purification apparatus decreases. When the temperature of the SCR catalyst is within the predetermined temperature range, the control apparatus reduces the amount of fuel injected from the fuel addition valve. Note that the predetermined temperature range may be set as a temperature range in which the $NO_X$ purification ratio decreases unless the amount of fuel injected from the fuel addition valve is reduced, Here, depending on the temperature of the SCR catalyst, the $NO_X$ purification ratio may vary in response to variation in an $NO_2$ ratio. Therefore, when fuel is injected from the fuel addition valve in this temperature range, the $NO_X$ purification ratio may decrease. When the amount of fuel injected from the fuel addition valve is reduced, on the other hand, a reduction in the oxidation capacity of the first exhaust gas purification apparatus can be suppressed, and as a result, a reduction in the $NO_X$ purification ratio can be suppressed. Note that the predetermined condition for injecting fuel from, the fuel addition valve may be a condition on which to execute a blockage prevention injection. The blockage prevention injection may be performed at prescribed intervals. In other words, the predetermined condition may be set to be established at prescribed intervals. Further, a case in which the blockage prevention injection is implemented may be set to correspond to a case in which "the predetermined condition for injecting fuel from the fuel addition valve is established".

In the present invention, the predetermined temperature range may be a temperature range in which an $NO_X$ purification ratio of the second exhaust gas purification apparatus varies in response to variation in a proportion of $NO_2$ within an amount of $NO_X$ contained in the exhaust gas that flows into the second exhaust gas purification apparatus.

When the amount of fuel injected from the fuel addition valve is reduced, the $NO_2$ ratio decreases by a smaller amount. Accordingly, a larger amount of $NO_2$ can be caused to flow into the SCR catalyst, and as a result, a reduction in the $NO_X$ purification ratio can be suppressed. Further, by reducing the amount-of fuel injected from the fuel addition valve only in the temperature range where the $NO_X$ purification ratio of the SCR catalyst varies in response to variation in the $NO_2$ ratio, an increase in the temperature of the fuel addition valve can be suppressed, outside the predetermined temperature range. Moreover, outside the predetermined temperature range, the $NO_X$ purification ratio is not affected even when the $NO_X$ ratio is increased by reducing the amount of fuel injected from the fuel, addition valve, and there is therefore no need to reduce the fuel injection amount. Note that when the $NO_X$ purification ratio varies in response to variation in the $NO_2$ ratio by an amount that is equal to or smaller than, a predetermined amount considered to be extremely small, the $NO_X$ purification ratio may be considered not to have varied.

In the present invention, the control apparatus may calculate a fuel injection amount that serves as a reference in the fuel addition valve when the predetermined condition for injecting fuel from the fuel addition valve is established, reduce an actual fuel injection amount below the reference fuel injection amount when the temperature of the second exhaust gas purification apparatus is within the predetermined temperature range, and increase the actual fuel injection amount above the reference fuel injection amount when the temperature of the second exhaust gas purification apparatus is within a temperature range that is lower than and adjacent to the predetermined temperature range or a temperature range that is higher than and adjacent to the predetermined temperature range.

The fuel injection amount serving as a reference (also referred to hereafter as a reference injection amount) is a fuel injection amount required to prevent a blockage from occurring in the fuel addition valve, and is calculated on the basis of an operating condition of the internal combustion engine, for example. When the reference injection amount is too small, it becomes difficult to prevent a blockage from occurring in the fuel addition valve, and when the reference injection amount is too large, an amount of consumed fuel increases, leading to a reduction in fuel efficiency. Hence, the reference injection amount may be set at a lower limit value of a fuel injection amount required to prevent a blockage from occurring in the fuel addition valve.

When fuel is injected from the fuel addition valve in a situation where the $NO_X$ purification ratio may decrease due to the fuel injection, the fuel is injected in a smaller amount than the reference injection amount. By injecting the fuel in a smaller amount than the reference injection amount, a reduction in the $NO_X$ purification ratio can be suppressed. However, the temperature of the fuel addition valve increases, and as a result, a blockage may occur. Therefore, the temperature of the fuel addition valve is reduced more than necessary by injecting fuel in a larger amount than the reference injection amount in advance before the temperature of the second exhaust gas purification apparatus enters a predetermined temperature range. Thus, even when the temperature of the fuel addition valve increases while the temperature of the second exhaust gas purification apparatus is within the predetermined temperature range, a degree of leeway remains relative to a temperature at which a blockage occurs, and therefore a blockage can be prevented from occurring.

In the present invention, the control apparatus may set the amount of fuel injected from the fuel addition valve at the reference fuel injection amount when an integrated value of a value obtained by subtracting the reference fuel injection amount from an actual fuel injection amount falls to or below a predetermined value.

The integrated value of the value obtained by subtracting the reference injection amount from the actual fuel injection amount is connected to the temperature of the fuel addition valve. More specifically, when a larger amount of fuel than the reference injection amount is injected, the temperature of the fuel addition valve decreases more than necessary, and when a smaller amount of fuel than the reference injection amount is injected, the temperature of the fuel addition valve increases beyond the temperature required to prevent a blockage. Variation in the temperature of the fuel addition valve is determined in accordance with an amount of variation relative to the reference injection amount. Hence, a correlative relationship exists between the amount of variation and the temperature of the fuel addition valve. The integrated value of the value obtained by subtracting the reference injection amount from the actual fuel injection amount expresses excess and deficiency in the temperature of the fuel addition valve. The temperature of the fuel addition valve may therefore be said to decrease steadily as the integrated value increases. When the temperature of the SCR catalyst remains within the predetermined temperature range continuously for a long time, however, the temperature of the fuel addition valve increases, and as a result, a blockage may occur. At such times, the integrated value of the value obtained by subtracting the reference injection amount from the actual fuel injection amount decreases. Therefore, a predetermined value is set as the integrated value, i.e. the integrated value of the value obtained by subtracting the reference injection amount from the actual fuel injection amount, at which a blockage may occur in the fuel addition valve, and when the integrated value falls to or below the predetermined value, the amount of fuel injected from the fuel addition valve is set at the reference injection amount. As a result, the temperature of the fuel addition valve can be maintained at a temperature at which a blockage does not occur.

Note that when a long period of time elapses following an increase or a reduction in the fuel injection amount, the effect of the increase or reduction on the current temperature of the fuel addition valve decreases. Accordingly, the integrated value may be set as an integrated value integrated over a predetermined period,

EFFECT OF THE INVENTION

According to the present invention, a reduction in an $NO_X$ purification ratio can be suppressed when an addition is

BRIEF DESCRIPTION OF THE DRAWINGS

FIG. 5 is a view showing a relationship between, the temperature of the SCR catalyst and a correction coefficient of a reference injection amount; and FIG. 6 is a time chart showing examples of transitions of respective parameters relating to the internal combustion engine when the routine shown in FIG. 4 is implemented.

MODES FOR CARRYING OUT THE INVENTION

Exemplary embodiments of the invention will be described in detail below with reference to the drawings. Note, however, that unless specified otherwise, the scope of the invention is not limited only to dimensions, materials, shapes, relative arrangements, and so on of constituent components described in the embodiments.

[First Embodiment]

Figure 1:
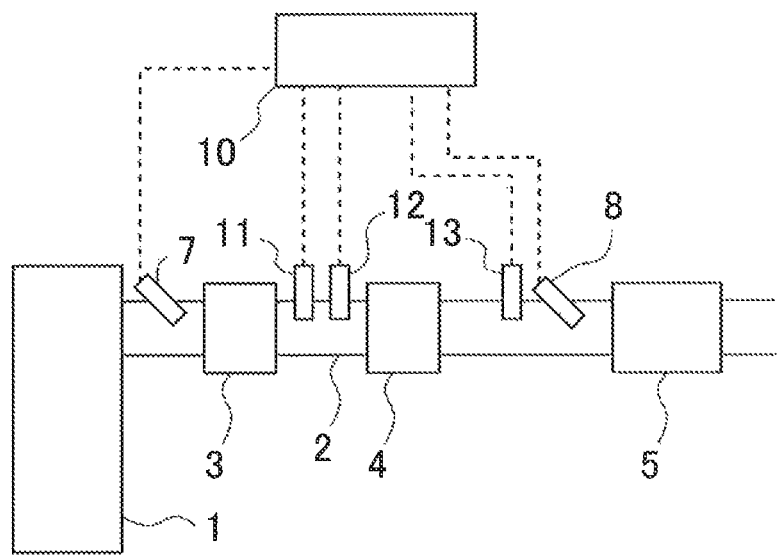
FIG. 1 is a schematic view showing a configuration of an internal combustion engine and an exhaust system thereof according to an embodiment.

FIG. 1 is a schematic view showing a configuration of an internal combustion engine and an exhaust system thereof according to this embodiment. An internal combustion engine 1 shown in FIG. 1 is a diesel engine, but may be a gasoline engine. The internal combustion engine 1 is installed in a vehicle, for example.

An exhaust passage 2 is connected to the internal combustion engine 1. An oxidation catalyst 3, a filter 4, and a selective reduction type $NO_X$ catalyst 5 (referred to hereafter as an SCR catalyst 5) are provided midway in the exhaust passage 2 in sequence from an upstream side.

The oxidation catalyst 3 has an oxidation capacity, and oxidizes HC or CO, for example, contained in exhaust gas. The oxidation catalyst 3 may be another catalyst having an oxidation capacity (a three-way catalyst or an occlusion reduction type $NO_X$ catalyst, for example). In this embodiment, the oxidation catalyst 3 corresponds to a first exhaust gas purification apparatus of the present invention.

The filter 4 collects particulate matter (PM) contained, in the exhaust gas. Note that the oxidation catalyst 3 may be carried on the filter 4.

The SCR catalyst 5 adsorbs a reducing agent so that when $NO_X$ passes through the SCR catalyst 5, the $NO_X$ is selectively reduced by the adsorbed reducing agent. $NH_3$ can be used as the reducing agent supplied to the SCR catalyst 5. Note that the SCR catalyst 5 may be carried on the filter 4. For example, the filter 4 carrying the SCR catalyst 5 may be provided downstream of the oxidation catalyst 3. Alternatively, the SCR catalyst 5 may foe provided downstream of the filter 4 carrying the oxidation catalyst 3. In this embodiment, the SCR catalyst 5 corresponds to a second exhaust gas purification apparatus of the present invention.

A fuel addition valve 7 that injects fuel (HC) into the exhaust gas flowing through the exhaust passage 2 is provided in the exhaust passage 2 upstream of the oxidation catalyst 3. When HC is added to the exhaust gas from the fuel addition valve 7, the HC reacts in the oxidation catalyst 3, and a temperature of the exhaust gas is increased by reaction heat generated, as a result, HC is added from the fuel addition valve 7 in order to increase respective temperatures of the oxidation catalyst 3, the filter 4, and the SCR catalyst 5, for example.

Further, an ammonia addition valve 8 that adds urea water or ammonia ($NH_3$) to the exhaust gas is provided in the exhaust passage 2 downstream of the filter 4 and upstream of the SCR catalyst 5. The urea water is hydrolyzed by the heat of the exhaust gas so as to form ammonia. Note that the ammonia addition valve 8 may be provided upstream of the oxidation catalyst 3, or downstream of the oxidation catalyst 3 and upstream of the filter 4. The ammonia is used by the SCR catalyst 5 as the reducing agent.

Furthermore, a first temperature sensor 11 for detecting the temperature of the exhaust gas and an air-fuel ratio sensor 12 for detecting an air-fuel ratio of the exhaust gas are attached to the exhaust passage 2 downstream of the oxidation catalyst 3 and upstream of the filter 4. Note that the temperature of the oxidation catalyst 3 or the temperature of the filter 4 can be detected by the first temperature sensor 11. Moreover, the air-fuel ratio of the exhaust gas that flows out of the oxidation catalyst 3 or the. air-fuel ratio of the exhaust gas that flows into the filter 4 can be detected by the air-fuel ratio sensor 12. Further, a second temperature sensor 13 for detecting the temperature of the exhaust gas is attached, to the exhaust passage 2 downstream of the filter 4 and upstream of the ammonia addition valve 8. The temperature of the filter 4 or the temperature of the SCR catalyst 5 can be detected by the second temperature sensor 13. Note that temperature sensors may be attached respectively to the oxidation catalyst 3, the filter 4, and the SCR catalyst 5 so that the respective temperatures of these members are detected directly.

The sensors described above do not all have to be attached, and a part thereof may be selected appropriately and attached.

An ECU 10 serving as an electronic control unit for controlling the internal combustion engine 1 having the above configuration is annexed to the internal combustion engine 1. The ECU 10 controls the internal combustion engine 1 in accordance with operating conditions of the internal combustion engine 1 and driver requirements.

The sensors described above are connected to the ECU 10 via electric wires so that, output signals from the sensors are input into the ECU 10. Further, the fuel addition valve 7 and the ammonia addition valve 8 are connected to the ECU 10 via electric wires such that these devices are controlled by the ECU 10.

The ECU 10 increases the temperatures of the oxidation catalyst 3 and the exhaust gas by supplying HC to the oxidation catalyst 3. For example, when the temperature of the SCR catalyst 5 is low such that an $NO_X$ purification ratio is low, the temperature of the SCR. catalyst 5 can be increased by supplying HC to the oxidation catalyst 3. Moreover, when the purification ratio is to be increased by increasing the temperature of the oxidation catalyst 3, the temperature of the oxidation catalyst 3 can be increased by supplying HC to the oxidation catalyst 3.

Further, when an amount of PM collected in the filter 4 reaches a threshold, the ECU 10 increases the temperature of the exhaust gas by supplying HC to the oxidation, catalyst 3. Accordingly, the temperature of the filter 4 increases such that the PM is oxidized. In so doing, the PM can be removed from the filter 4. As a result, the filter 4 is regenerated. Note that when an occlusion reduction type $NO_X$ catalyst is provided downstream of the oxidation catalyst 3, a temperature of the occlusion reduction type $NO_X$ catalyst can be increased by supplying HC to the oxidation catalyst 3, and in so doing, sulfur poisoning can be eliminated.

To supply HC to the oxidation catalyst 3 in this manner, the ECU 10 adds fuel from the fuel addition valve 7.

Further, to reduce the temperature of the fuel addition valve 7, the ECU 10 implements a blockage prevention injection in which fuel is injected from, the fuel addition valve 7. The blockage prevention injection is implemented at prescribed intervals while the internal combustion engine 1 is operative, and the prescribed intervals are determined in advance such that the temperature of the fuel addition valve 7 reaches a prescribed temperature serving as a temperature at which a blockage is prevented. Furthermore, the ECU 10 calculates a reference injection amount, which is a fuel injection amount at which the temperature of the fuel addition valve 7 reaches the temperature at which a blockage is prevented, and implements the blockage prevention injection in accordance with the reference injection amount.

When the blockage prevention injection is implemented, however, the oxidation capacity of the oxidation catalyst 3 decreases, leading to a reduction in the amount of NO that is oxidized into $NO_2$ in the oxidation catalyst 3 and the filter 4. As a result, a ratio (an $NO_2$ ratio) of an amount of $NO_2$ relative to an amount of $NO_X$ flowing into the SCR catalyst 5 decreases. Note that a sum of the respective amounts of NO and $NO_2$ may be set as the amount of $NO_X$. Depending on the temperature of the SCR catalyst 5, the $NO_X$ purification ratio may decrease when the $NO_2$ ratio decreases.

Figure 2:
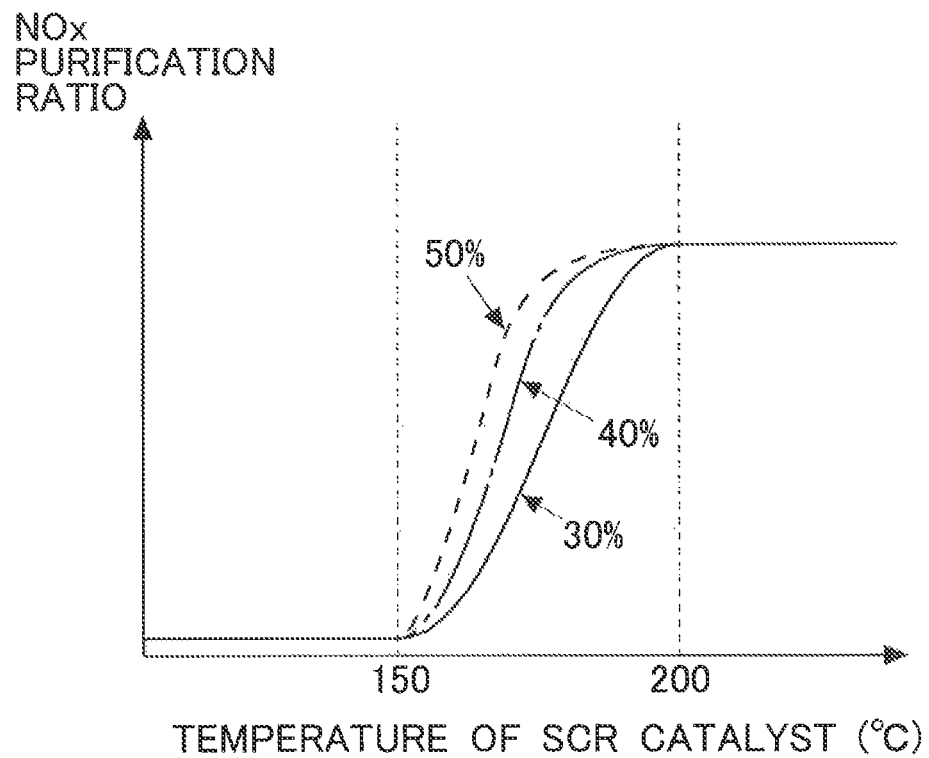
FIG. 2 is a view showing a relationship between a temperature of an SCR catalyst and an $NO_X$ purification ratio of the SCR catalyst.

Here, FIG. 2 is a view showing a relationship between the temperature of the SCR catalyst 5 and the $NO_X$ purification ratio of the SCR catalyst 5. A solid line, a dot-dash line, and a dotted line respectively denote cases in which the $NO_X$ ratio is 30%, 40%, and 50%.

As shown in FIG. 2, the $NO_X$ purification ratio increases as the temperature of the SCR catalyst 5 increases. When the temperature of the SCR catalyst 5 is within a range of 150° C. to 200° C., for example, the $NO_X$ purification ratio increases as the $NO_2$ ratio approaches 50%. In this temperature range, identical amounts of NO and $NO_2$ are required to reduce the $NO_X$, and therefore the $NO_X$ purification ratio is at a maximum when the $NO_2$ ratio is 50%. When, on the other hand, the temperature of the SCR catalyst 5 is lower than 150° C., for example, and higher than 200° C., for example, the $NO_X$ purification ratio is determined substantially according to the temperature, and therefore the $NO_2$ ratio has substantially no effect thereon.

Incidentally, the $NO_2$ ratio of gas newly discharged from the internal combustion engine 1 is lower than 50%, but by oxidizing the NO in the oxidation catalyst 3, the $NO_2$ ratio can be brought close to 50%. Note that the oxidation catalyst 3 may be provided with an oxidation capacity at which the $NO_2$ ratio approaches 50%

Even when the oxidation capacity of the oxidation catalyst 3 disposed in the exhaust passage 2 is adjusted such that the $NO_2$ ratio approaches 50%, the oxidation capacity of the oxidation catalyst 3 decreases following implementation of the blockage prevention injection, leading to a reduction in the $NO_2$ ratio, and as a result, the $NO_X$ purification ratio of the SCR catalyst 5 decreases.

According to this embodiment, therefore, in a predetermined temperature range where the $NO_X$ purification ratio varies in response to variation in the $NO_2$ ratio, a reduction in the oxidation capacity of the oxidation catalyst 3 is suppressed by reducing the amount of fuel injected during the blockage prevention injection below the amount of fuel injected at another temperature. The amount of fuel injected at this time is smaller than the reference injection amount. By reducing the amount of fuel injected from the fuel addition valve 7, a reduction in the oxidation capacity of the oxidation catalyst 3 can be suppressed, and as a result, oxidation of the NO can be promoted. Note that the oxidation capacity of the oxidation catalyst 3 decreases steadily as the amount of fuel injected during the blockage prevention injection increases.

By reducing the amount of fuel injected during the blockage prevention injection when the temperature of the SCR catalyst 5 is within the predetermined temperature range in this manner, the $NO_X$ purification ratio can be increased.

When the amount of fuel injected during the blockage prevention injection is reduced below the reference injection amount, however, the temperature of the fuel addition valve 7 may increase beyond the prescribed temperature serving as the temperature at which a blockage is prevented. In other words, a blockage may occur in the fuel addition valve 7.

According to this embodiment, therefore, when the temperature of the SCR catalyst 5 is within a temperature range that is higher or lower than the predetermined temperature range and adjacent to the predetermined temperature range, the amount of fuel injected during the blockage prevention injection may be increased above the reference injection amount.

Figure 3:
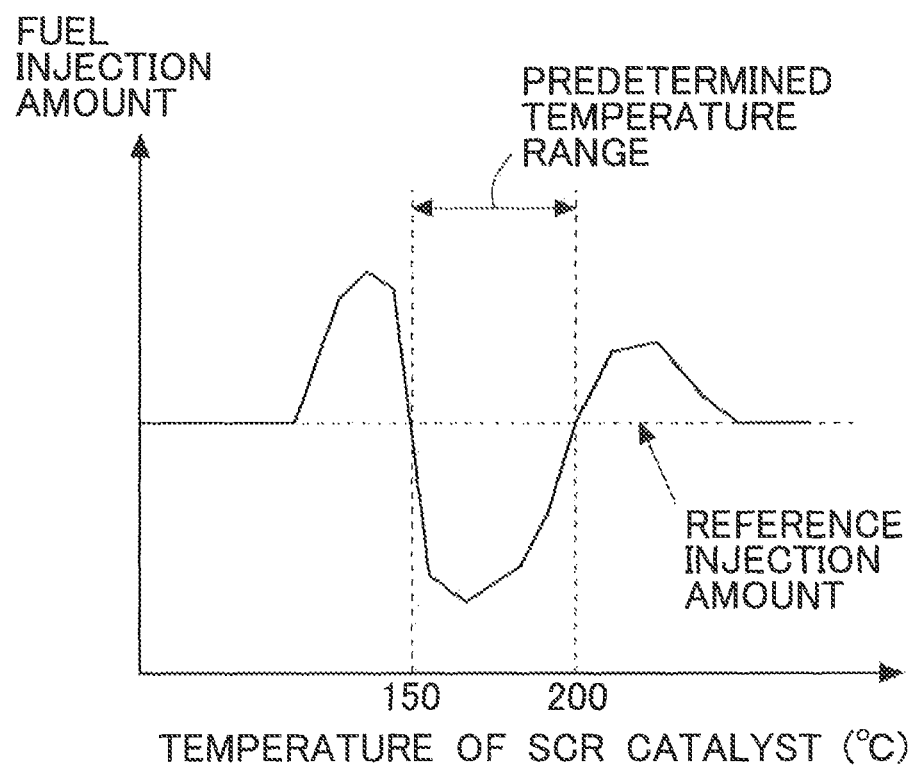
FIG. 3 is a view showing a relationship between the temperature or the SCR catalyst and a fuel injection amount of a blockage prevention injection.

Here, FIG. 3 is a view showing a relationship between the temperature of the SCR catalyst 5 and the amount of fuel injected during the blockage prevention injection. By increasing the amount of fuel injected during the blockage prevention injection above the reference injection amount in an adjacent temperature range to the predetermined temperature range, the temperature of the fuel addition valve 7 decreases below the prescribed temperature serving as the temperature at which a blockage is prevented. Accordingly, when the temperature of the SCR catalyst 5 enters the predetermined temperature range, the temperature of the fuel addition valve 7 is in a condition of having been reduced more than necessary, and therefore the temperature of the fuel addition valve 7 can be prevented from, increasing beyond the prescribed temperature even after the amount of fuel injected during the blockage prevention injection is reduced. Note that the amount of fuel injected during the blockage prevention injection may be increased above the reference injection amount in at least one of a case where the temperature of the SCR catalyst 5 is lower than the predetermined temperature range and a case where the temperature of the SCR catalyst 5 is higher than the predetermined temperature range.

Further, the temperature range in which the fuel injection amount of the blockage prevention injection is increased above the reference injection amount may be determined in consideration of an increase in fuel consumption and so on. Here, by widening the temperature range in which the fuel injection amount of the blockage prevention injection is increased above the reference injection amount, a blockage can be suppressed more reliably, but the fuel consumption may increase. Moreover, when the temperature range in which the fuel injection amount of the blockage prevention injection is increased above the reference injection amount is too narrow, the probability of a blockage increases. The temperature range in which the fuel injection amount of the blockage prevention injection is increased above the reference injection amount may therefore be determined through experiments or simulations in consideration of preventing an increase in fuel consumption and suppressing a blockage. The fuel injection amount at this time may foe determined similarly.

When the temperature of the SCR catalyst 5 remains within the predetermined temperature range for a long time, the temperature of the fuel addition valve 7 may increase above the prescribed temperature serving as the temperature at which a blockage is prevented. According to this embodiment, therefore, the fuel injection amount of the blockage prevention injection may be returned to the reference injection amount when an integrated value of a value obtained by subtracting the reference injection amount from an actual fuel injection amount fails to or below a predetermined value, for example. Further, when a total reduction in the amount of fuel injected after reducing the fuel injection amount below the reference injection amount is larger than a total increase in the amount of fuel injected after increasing the fuel injection amount above the reference injection amount, for example, a. blockage may occur in the fuel addition valve 7, and therefore the amount of fuel injected during the blockage prevention injection, may be returned to the reference injection amount.

Figure 4:
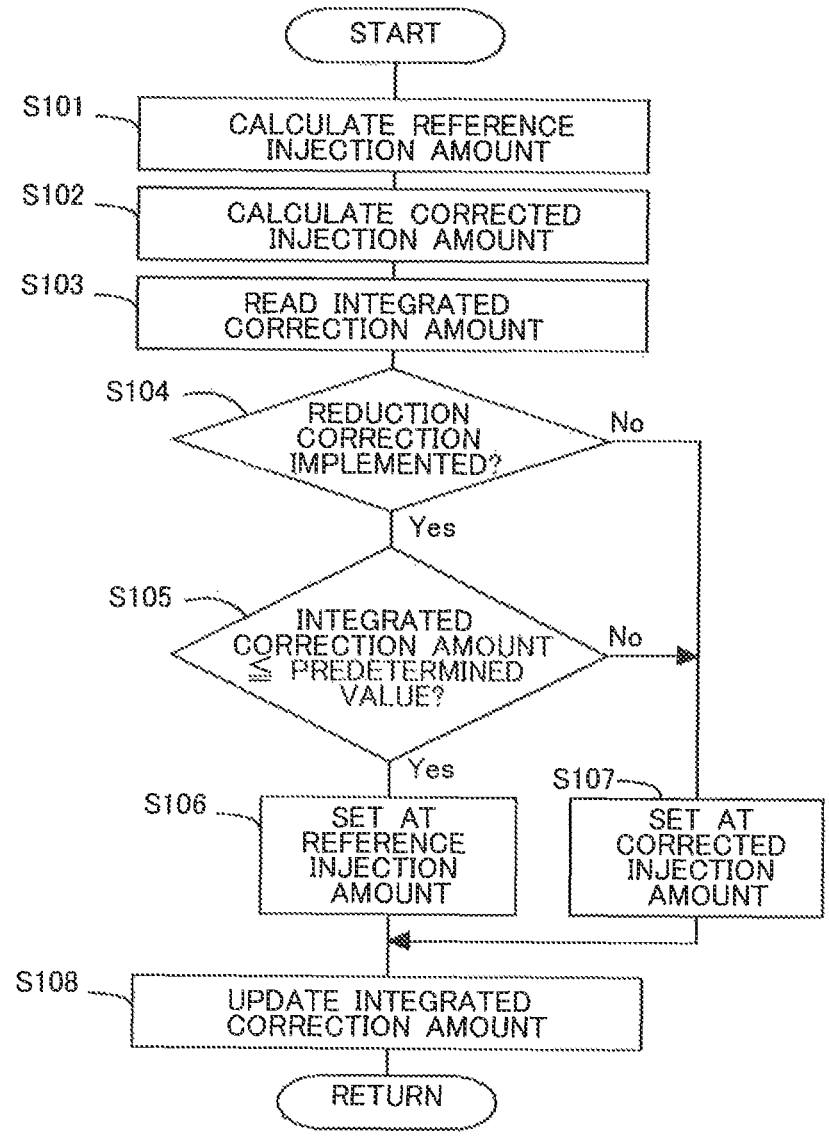
FIG. 4 is a flowchart showing a flow for determining the fuel injection amount of the blockage prevention injection.

FIG. 4 is a flowchart showing a flow for determining the fuel injection amount of the blockage prevention injection. This routine is executed by the ECU 10 repeatedly at predetermined time intervals. Note that in this embodiment, the ECU 10 that performs the processing of the routine shown in FIG. 4 corresponds to a control apparatus of the present invention, In step S101, the reference injection amount is calculated as a fuel injection amount at which the temperature of the fuel addition valve 7 reaches the temperature at which a blockage is prevented. Here, the temperature of the fuel addition valve 7 varies according to an engine rotation speed and an engine load. In. other words, the reference injection amount has a correlative relationship with the engine rotation speed and the engine load. Therefore, a map or a formula defining a relationship between the reference injection amount and the engine rotation speed and engine load is determined in advance by experiments, simulations, or the like, and stored in the ECU 10.

In step S102, an amount of fuel (a corrected injection amount) actually injected during the blockage prevention injection is calculated by correcting the reference injection amount. Here, FIG. 5 is a view showing a relationship between the temperature of the SCR catalyst 5 and a correction coefficient of the reference injection amount. The relationship shown in FIG. 5 corresponds to the relationship shown in FIG. 3. More specifically, a map shown in FIG. 5 is set such that a fuel injection amount obtained by multiplying the correction coefficient calculated In step S102 by the reference injection amount calculated in step S101 corresponds to the fuel injection amount shown in FIG. 3. An optimum value of the correction coefficient is determined in advance by experiments, simulations, or the like, and stored in the ECU 10.

In step S103, an integrated correction amount is read. The integrated correction amount is an integrated value obtained by integrating the value obtained by subtracting the reference injection amount from the actual fuel injection amount. In other words, the integrated, correction amount is obtained by adding the part, of the fuel injection amount that is larger than the reference injection amount and subtracting the part, of the fuel injection amount that is smaller than the reference injection amount. Mote that a value integrated over a predetermined period before a current, time may be used as the integrated correction amount.

In step S104, a determination is made as to whether or not a reduction correction has been implemented to reduce the fuel injection amount of the blockage prevention injection. In other words, a determination is made as to whether or not the corrected injection amount is smaller than the reference injection amount. In this step, a determination may be made as to whether or not the temperature of the SCR catalyst 5 is within the predetermined temperature range. When the determination of step S104 is affirmative, the routine advances to step S105, and when the determination is negative, the routine advances to step S107.

In step S105, a determination is made as to whether or not the integrated correction amount is equal to or smaller than a predetermined value. In this step, a determination is made as to whether or not it is possible to prevent a blockage from occurring in the fuel addition valve 7. Here, the predetermined value is an integrated correction amount at which a blockage can be prevented from occurring in the fuel addition valve 7, and is set at 0, for example. Alternatively, the predetermined value may be set on the basis of a result of an experiment, a simulation, or the like. In this step, a determination is made as to whether or not the reduction correction for reducing the amount of fuel injected during the blockage prevention injection has been implemented for a prolonged period such that there is a risk of a blockage occurring in the fuel addition valve 7. When the determination of step S105 is affirmative, the routine advances to step S106, and when the determination is negative, the routine advances to step S107.

In step S106, the amount of fuel injected, during the blockage prevention injection is set at the reference injection amount. In other words, the reduction correction for reducing the amount of fuel, injected during the blockage prevention injection has been implemented for a. prolonged period such that there is a risk of a blockage occurring in the fuel addition valve 7, and therefore the reduction correction is prohibited.

In step S107, the amount of fuel injected during the blockage prevention injection is set at the corrected injection amount, As a result, a reduction in the $NO_X$ purification ratio can be suppressed while preventing a blockage from occurring in the fuel addition valve 7.

Here, FIG. 6 is a time chart showing examples of transitions of respective parameters relating to the internal combustion engine 1 when the routine shown in FIG. 4 is implemented. In FIG. 6, a "vehicle speed" denotes a speed of the vehicle in which the internal combustion engine 1 is installed, a "fuel injection amount" denotes the amount of fuel injected during the blockage prevention injection, and a "$NO_X$ purification ratio" denotes an amount of $NO_X$ reduced by the SCR catalyst 5 relative to the amount of $NO_X$ flowing into the SCR catalyst 5. Solid lines denote a case in which the control according to this embodiment is implemented, and dotted lines denote a case in which the blockage prevention injection is implemented in a conventional manner such that the reference injection amount is injected at all times.

According to this embodiment, the temperature of the SCR catalyst 5 is in a temperature range that is lower than and adjacent to the predetermined temperature range at a time T1, and therefore an increase correction is performed to increase the amount of fuel injected during the blockage prevention, injection. At this time, the temperature of the fuel addition valve 7 decreases further than in the conventional case. Moreover, at this time, although the $NO_2$ ratio decreases, the temperature of the SCR catalyst 5 is low, and therefore the $NO_X$ purification ratio is substantially identical to that of the conventional case.

Furthermore, according to this embodiment, the temperature of the SCR catalyst 5 is within the predetermined temperature range at a time T2, and therefore the reduction correction is performed to reduce the amount of fuel injected during the blockage prevention injection. At this time, due to the effect of the increase correction performed at the time T1, the temperature of the fuel addition valve 7 is low, and therefore, even though the temperature of the fuel addition valve 7 has increased at the time T2, the temperature remains lower than that of the conventional case. By performing the reduction correction on the amount of fuel injected during the blockage prevention injection, a reduction in the $NO_2$ ratio is suppressed in comparison with the conventional case, and as a result, a reduction in the $NO_X$ purification ratio is suppressed.

Moreover, according to this embodiment, the integrated correction amount decreases to the predetermined. value at a time T3, and therefore the reduction correction for reducing the fuel injection amount of the blockage prevention injection is prohibited at a time T4. As a result, the fuel injection amount becomes identical to that of the conventional case.

According to this embodiment, as described above, when the temperature of the SCR catalyst 5 is within the predetermined temperature range, the reduction correction is implemented to reduce the fuel injection amount of the blockage prevention injection, and in so doing, a reduction in the $NO_X$ purification ratio can be suppressed. Further, when the temperature of the SCR catalyst 5 is outside the predetermined temperature range but in an adjacent temperature range to the predetermined temperature range, the increase correction is implemented to increase the fuel injection amount of the blockage prevention injection. In so doing, an excessive increase in the temperature of the fuel addition valve 7 can be suppressed even when the reduction correction is implemented thereafter. As a result, a blockage can be prevented from occurring in the fuel addition valve 7, Moreover, when the integrated correction amount falls to or below the predetermined value, the reduction correction is prohibited, and as a result, a blockage caused by an increase in the temperature of the fuel addition valve 7 can be suppressed.

EXPLANATION OF REFERENCE NUMERALS AND CHARACTERS

1 internal combustion engine
2 exhaust passage
3 oxidation catalyst
4 filter
5 selective reduction type $NO_X$ catalyst (SCR catalyst)
7 fuel addition valve
8 ammonia addition valve
10 ECU
11 first temperature sensor
12 air-fuel ratio sensor
13 second temperature sensor

The invention claimed is:

1. An exhaust gas purification apparatus for an internal combustion engine, comprising:
    a first exhaust gas purification apparatus that is provided in an exhaust passage of the internal combustion engine and has an oxidation capacity;
    a second exhaust gas purification apparatus that is provided in the exhaust passage downstream of the first exhaust gas purification apparatus, and has a function for selectively reducing NOx;
    a fuel addition valve provided in the exhaust passage upstream of the first exhaust gas purification apparatus in order to inject fuel into exhaust gas; and
    an electronic control unit (ECU) configured to control the fuel addition valve to execute a plurality of blockage prevention injections, wherein the blockage prevention injections are fuel injections which prevent a blockage from occurring in the fuel addition valve, and when a temperature of the second exhaust gas apparatus is within a predetermined temperature range while a predetermined condition for executing one of the blockage prevention injections is established, an amount of fuel injected during the blockage prevention injection is reduced below an amount of fuel injected when the temperature of the second exhaust gas purification apparatus is outside the predetermined temperature range.

2. The exhaust gas purification apparatus for an internal combustion engine according to claim 1, wherein the predetermined temperature range is a temperature range in which an NOx purification ratio of the second exhaust gas purification apparatus varies in response to variation in a proportion of $NO_2$ within an amount of NOx contained in the exhaust gas that flows into the second exhaust gas purification apparatus.

3. The exhaust gas purification apparatus for an internal combustion engine according to claim 1, wherein the electronic control unit calculates a fuel injection amount that serves as a reference fuel injection amount in the fuel addition valve when the predetermined condition for executing the blockage prevention injection is established, reduces an actual fuel injection amount below the reference fuel injection amount when the temperature of the second exhaust gas purification apparatus is within the predetermined temperature range, and increases the actual fuel injection amount above the reference fuel injection amount when the temperature of the second exhaust gas purification apparatus is within a temperature range that is lower than and adjacent to the predetermined temperature range or a temperature range that is higher than and adjacent to the predetermined temperature range.

4. The exhaust gas purification apparatus for an internal combustion engine according to claim 3, wherein the electronic control unit sets the amount of fuel injected during the blockage prevention injection at the reference fuel injection amount when an integrated value of a value obtained by subtracting the reference fuel injection amount from an actual fuel injection amount falls to or below a predetermined value.

* * * * *